United States Patent
Breeze et al.

(10) Patent No.: US 10,538,706 B2
(45) Date of Patent: Jan. 21, 2020

(54) WASTE PROCESSING SYSTEM

(71) Applicant: Greenenz Energy Finance Limited, Central, Hong Kong (HK)

(72) Inventors: Wayne Breeze, Hawkes Bay (NZ); Mark Riddiford, Greytown (NZ)

(73) Assignee: CIRCULAR RESOURCES (IP) PTE LIMITED, Oue Downtown (SG)

( * ) Notice: Subject to any disclaimer, the term of this patent is extended or adjusted under 35 U.S.C. 154(b) by 26 days.

(21) Appl. No.: 16/117,880

(22) Filed: Aug. 30, 2018

(65) Prior Publication Data
US 2019/0062636 A1 Feb. 28, 2019

Related U.S. Application Data

(60) Provisional application No. 62/552,080, filed on Aug. 30, 2017.

(51) Int. Cl.
| | |
|---|---|
| *C10B 47/30* | (2006.01) |
| *C10B 21/18* | (2006.01) |
| *B09B 3/00* | (2006.01) |
| *C10B 53/07* | (2006.01) |
| *C10B 27/06* | (2006.01) |
| *C10B 53/00* | (2006.01) |

(52) U.S. Cl.
CPC ............ *C10B 47/30* (2013.01); *B09B 3/0075* (2013.01); *B09B 3/0083* (2013.01); *C10B 21/18* (2013.01); *C10B 27/06* (2013.01); *C10B 53/00* (2013.01); *C10B 53/07* (2013.01)

(58) Field of Classification Search
None
See application file for complete search history.

(56) References Cited

U.S. PATENT DOCUMENTS

| | | | |
|---|---|---|---|
| 5,662,050 A | | 9/1997 | Angelo, II et al. |
| 5,771,820 A | * | 6/1998 | Ruegg ....................... C10B 1/10 110/346 |
| 6,203,765 B1 | * | 3/2001 | Taciuk ..................... B01J 19/28 196/112 |
| 6,305,302 B2 | | 10/2001 | Kleiss |
| 6,932,002 B2 | | 8/2005 | May et al. |
| 8,690,975 B2 | | 4/2014 | Tsangaris et al. |

FOREIGN PATENT DOCUMENTS

| | | |
|---|---|---|
| CN | 102260536 A | 11/2011 |
| DE | 10 2005 000 768 A | 7/2006 |
| KR | 10-1326670 B1 | 11/2013 |

OTHER PUBLICATIONS

International Search Report and Written Opinion issued in corresponding International Application No. PCT/IB18/56653 dated Jan. 2, 2019.

* cited by examiner

*Primary Examiner* — Derek N Mueller
(74) *Attorney, Agent, or Firm* — Squire Patton Boggs (US) LLP (57) ABSTRACT

A disposal system for the processing of solid waste devices to recycle materials located within the devices and recover, reuse and recycle such materials. Such system may include a primary chamber and secondary chamber, attached preferably by use of one or more exhaust ducts, and a secondary chamber exhaust duct. The solid waste devices may include any type of waste, such as electronics waste, medical device waste, and the like.

11 Claims, 7 Drawing Sheets

WASTE PROCESSING SYSTEM

CROSS REFERENCE TO RELATED APPLICATION

This application is related to and claims the priority of U.S. Provisional Patent Application No. 62/552,080, filed Aug. 30, 2017, which is hereby incorporated herein by reference in its entirety.

FIELD OF THE INVENTION

Certain embodiments may generally relate to the processing of waste. More specifically, certain embodiments may relate to a controlled combined pyrolysis and gasification method for processing waste to safely dispose of harmful components in the waste while enabling efficient recovery of precious metals and rare earth elements.

BACKGROUND OF THE INVENTION

The current most common way to dispose of waste is by use of a landfill. Landfill operators attempt to make sanitary landfills by filling a land area with successive layers of solid waste, principally household waste, and layers of earth or soil are well known. The uncontrolled landfill depends upon natural biological action, precipitation and climate to effect decomposition. As the waste decomposes, toxic materials in the waste may enter into the natural precipitation draining out of the landfill, thereby allowing highly toxic contaminated water to potentially contaminate underground water supplies, surface streams and wells. Due to the very slow stabilization, the uncontrolled landfill is not usable for other purposes for long periods of time and thus, particularly near metropolitan areas, represents a large waste of land resources.

Despite efforts to recycle materials in the waste, certain types of waste are difficult to recycle by use of the current standard methods.

For instance, electronic waste, otherwise known as e-scrap and e-waste, is trash generated from surplus, broken, and obsolete electronic devices. E-waste is prolific and toxic. It is well researched that only approximately 13% of e-waste is processed for materials recovery. In addition, e-waste volumes are increasing at a compounding 8% per annum. As such, landfills are usually not a permitted option due to long term leaching of heavy metals.

When disposed in landfills, e-waste contributes approximately 70% of the overall hazardous waste components despite by volume being a relatively small fraction of materials placed in the landfills. Further, e-waste equates to a material percentage of metals and minerals mined annually. For example, e-waste gold content equates to approximately 10% of the gold mined annually. Disposal of e-waste without the recovery of minerals and metals is inefficient and unsustainable long term. E-waste can also be particularly detrimental to the environment since such waste includes harmful lead compounds, mercury, cadmium, chromium, and chlorofluorocarbon (CFC) gases. Thus, the hazardous content of e-waste requires special management.

In years past, finding efficient and effective ways of disposing of such waste has been, and continues to be a challenge. For instance, incineration has not been a viable option due to nitrogen oxides (NOx) and sulfur oxides (SOx), acidity, arsenic, and heavy metals and other toxins that have detrimental effects on the atmosphere.

Most other solutions require manual deconstruction of feedstock, and are labor intensive. In addition, typical extraction of previous metals use high temperature refining methods, which produce emissions that require scrubber systems and high levels of energy. Other alternatives tend to require large-scale operations that are centralized and logistically less efficient. Moreover, other processes are per gram of metals recovered are more expensive to build and to operate. In addition, other developments of hydro digesters take a small percentage of electronic waste, such as ground up printed circuit boards and dissolve them. Further, post processing disposal of toxic residue concentrates is then required (i.e., hydrocarbon, flame-retardants, and other residues).

However, a majority of electronic products usually end up in landfills, and just a small percentage come back to be used in new electronic devices. In addition, recycling e-waste can be challenging because certain electronics are sophisticated devices manufactured from varying proportions of glass, metals, and plastics. Electronic devices generally contain valuable materials including copper, tin, iron, aluminum, palladium, titanium, gold, and silver. Therefore, there is a need to be able to find effective and safe ways to recover, reuse, and recycle such materials. This may be especially true when considering that recycling e-waste can help save energy and resources, reduce pollution, conserve landfill space, and ultimately provide environmentally safe methods of processing e-waste. There is also a need for smaller scale easy to deploy processing at the core of efficient e-waste processing.

Like e-waste, medical waste such as needles, syringes, glassware, and bandages, also has challenges in disposal. Current medical waste systems do not sanitize, sort or recycle the medical waste. Given that certain bacteria and viruses can be transmitted via biologically contaminated waste, care should be taken to destroy pathogens and thus minimize possible pathogen transmission. Instead, biologically contaminated medical waste is often disposed in landfills, which can be detrimental to the environment.

Current systems of disposing of medical waste include use of on-site incinerators. Incinerators may be effective in decontaminating and reducing the size of the medical waste materials, but are not satisfactory because they often have the danger of toxic gas emissions. In addition, on-site incinerators in large hospitals cannot be outfitted with adequate pollution control devices and run by highly trained technicians on a financially feasible basis. As a consequence, these incinerators may operate at pollution levels in excess of the legal limit or be run by less than adequately trained technicians. Other methods include use of disinfectant solutions, which can take up a large amount of space and risk contaminating the operator.

In all cases, the operators must remove the medical waste from its waste container, which is a rigid, container used by medical professionals to protect others from the pathogens residing on the medical waste. This process can be labor intensive, and expose the operators to the sharp objects contained within, such as needles and broken glass, and expose the operators to the pathogens contained within, including liquid and solid materials. There, therefore, is also a need for a system to process medical waste in a way that minimizes manual labor, destroys and disinfects medical waste products, while minimizing contact of the medical waste to the operator of the medical waste disposal system. It may also be desirable to recover metals and other materials from such medical waste, which current systems fail to address in any way.

For these, among other reasons, the inventors developed the currently presented system. Certain embodiments of present invention provide a system to effectively and safely process waste, such as e-waste, medical waste, and other types of waste, to recover, reuse, and recycle such materials. As a result, it may be possible to reduce pollution, conserve landfill space, and provide environmentally safe methods of processing and recycling waste materials.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

SUMMARY

According to certain embodiments, a waste processing method for a waste processing system may be provided. The waste processing system may have a heating chamber, a primary chamber disposed within the heating chamber, a secondary chamber, and a lid. The method may include loading feedstock into the primary chamber, heating the secondary chamber during the loading of the feedstock, and heating the heating chamber with the feedstock inside. The method may also include rotating the primary chamber while the primary chamber is being heated, cooling the heating chamber after the heating chamber is heated for a predetermined amount of time, and removing leftover concentrate after heating the heating chamber for the predetermined amount of time. In an embodiment, loading the feedstock may include rotating the primary chamber and the heating chamber to an operating position, securing the lid to an open end of the primary chamber, loading the primary chamber with an inert gas, and tilting the heating chamber and the primary chamber to a predetermined angle to facilitate processing of the feedstock.

In an embodiment, the method may also include heating the secondary chamber to a temperature range of about 1000° C. to about 1100° C., collecting, in the lid, syngas produced while heating the heating chamber, sending the syngas to the secondary chamber, burning the syngas in the secondary chamber, and exhausting the burned syngas out of the waste processing system. According to an embodiment, the temperature of the primary chamber and a timing of the rotation of the heating chamber may be controlled based on feedstock type and feedstock volume.

In another embodiment, the method may include heating the feedstock to a temperature of about 500° C. to about 600° C. tilting the heating chamber and the primary chamber to an angle of about 45°, and cooling the heating chamber with a cooling air fan. According to an embodiment, the rotation of the primary chamber may be performed by driving a drive motor, which is attached to a bottom surface of the primary chamber and the heating chamber. In an embodiment, the feedstock may include computer or electrical equipment, or medical waste items.

According to certain embodiments, a waste processing system may include a primary chamber section, and a secondary chamber section connected to the primary chamber section via an exhaust duct. The primary chamber section may include a heating chamber, a primary chamber disposed within the heating chamber, the primary chamber being configured to receive feedstock, and a burner configured to heat the heating chamber and the primary chamber. The secondary chamber section may include a secondary chamber, and a secondary chamber exhaust duct connected to the secondary chamber.

In an embodiment, the primary chamber may be loaded with an inert gas. According to another embodiment, the primary chamber section may include a lid that is configured to collect syngas produced while heating the heating chamber and the primary chamber. In another embodiment, the primary chamber section may include a cooling fan configured to cool the heating chamber.

In a further embodiment, the primary chamber comprises a plurality of heat transfer fins that are configured to transfer heat from the primary chamber to the heating chamber, and the plurality of heat transfer fins may be attached to an exterior surface of the primary chamber. According to an embodiment, the plurality of heat transfer fins may be made of the same material as the primary chamber.

According to an embodiment, the primary chamber section may include a drive motor configured to rotate the primary chamber, and the drive motor may be attached to a bottom surface of the primary chamber and the heating chamber. In an embodiment, the feedstock may include computer or electrical equipment, or medical waste items. In another embodiment, the secondary chamber section may include a syngas combustion air fan configured to supply combustion air to the secondary chamber. According to an embodiment, the secondary chamber section may include a syngas combustion air diffuser connected to the syngas combustion air fan and the secondary chamber exhaust duct.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

The examples described herein are for illustrative purposes only. As will be appreciated by one skilled in the art, certain embodiments described herein, including, for example, but not limited to, those shown in FIGS. 1(A)-4, may be embodied as a system, apparatus, or method.

Certain embodiments may provide a gasifier designed and built to process and efficiently extract metal and minerals from waste. The output obtained may include a synthetic ore in a format suitable for immediate hydrometallurgical refining. According to certain embodiments, this may be accomplished by providing precise control of indirect heat in a gasification (which may also be starved oxygen or no oxygen at all) atmosphere within a controlled pressure chamber. The pressure chamber may include internal fins therein such that when the pressure chamber rotates, the internal fins may provide agitation, and milling media such as grinding balls for reduction to fines. The pressure chamber may include alternative gas inputs to adjust a primary chamber atmosphere.

According to certain embodiments, the overall process of processing the waste may be controlled by a programmable logic control (PLC) system. In certain embodiments, the PLC system may read the various process measures such as temperatures, pressures, rotational speeds, atmospheric concentrations, speed of fans, flows and other process data, and adjust the parameters of the system in ways to maximize the process as a whole. The PLC system may also measure gaseous emissions, where the gaseous emissions may be dosed to achieve a particular pH balance and to control pyrolosis. The PLC system may also adjust the processes and parameters of the system in response to the waste materials added, in a time dependent manner, to account for the type of waste added, the volume of waste, the harmful contaminants in the waste, and the like to maximize the ability to recycle the outputted materials.

Figure 1A:
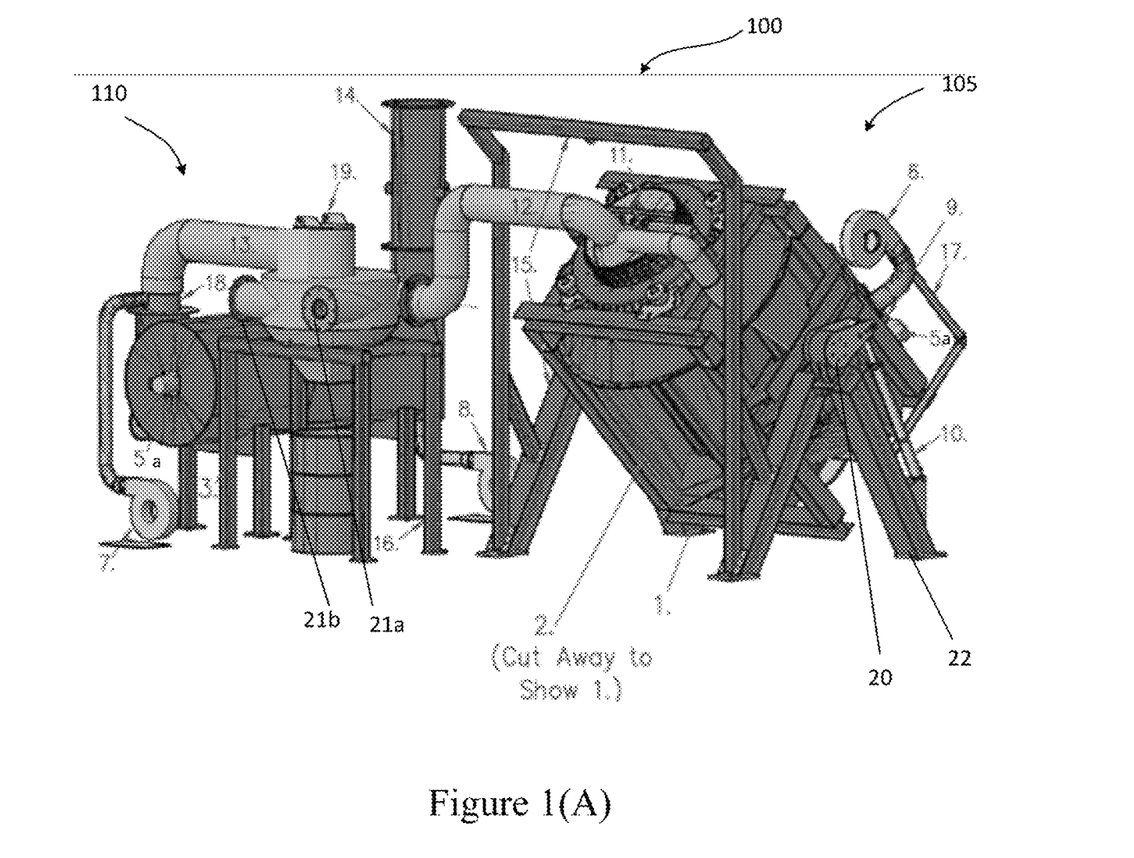
FIG. 1(A) illustrates a gasifier system according to certain embodiments.
Figure 1B:
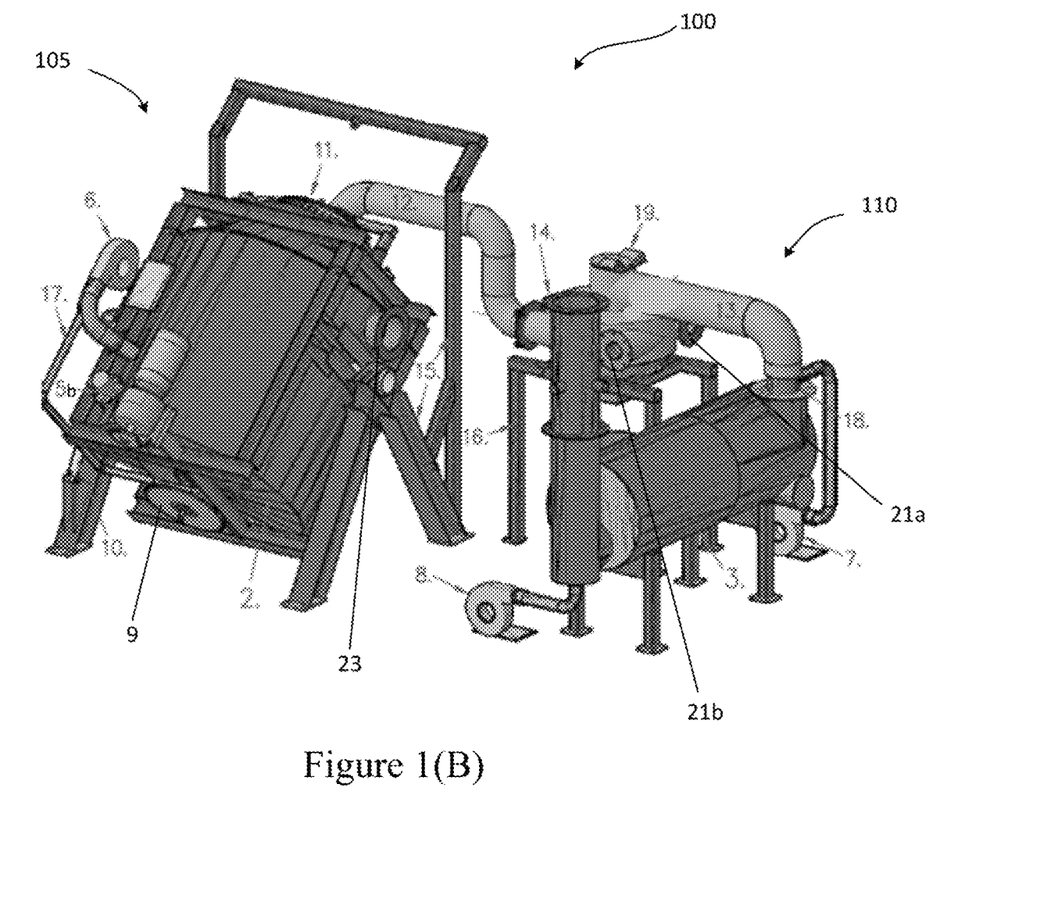
FIG. 1(B) illustrates a backside view of the gasifier system of FIG. 1(A) according to certain embodiments.

FIG. 1(A) illustrates a system 100 according to certain embodiments, and FIG. 1(B) illustrates a backside view of the system 100 of FIG. 1(A) according to certain embodiments. In particular, the system 100 may include a primary chamber section 105 and a secondary chamber section 110. As illustrated in FIG. 1, the primary chamber section 105 is interconnected with the secondary chamber section 110 via an exhaust duct 12, and secondary chamber exhaust duct 13. FIG. 1(A) also illustrates that the primary chamber section 105 includes a primary chamber 1 that is disposed within a heating chamber 2. According to certain embodiments, the primary chamber 1 may be made of various materials including, for example, stainless steel. Further, the primary chamber 1 is affixed to the heating chamber 2, but may be separated from the heating chamber 2 for maintenance purposes. During operation, the primary chamber 1 may be configured to rotate by being driven by a gearbox and drive motor 9. As illustrated in FIG. 1(B), the gearbox 9 may be attached to a bottom surface of the primary chamber 1 and heating chamber 2. The rotation motion can be accomplished via a chain drive, hydraulic motor, or other high torque low speed power transmission means. In certain embodiments, variations in rotation speed are preferred during operation. Therefore the rotation may be controlled by a Variable Frequency Drive, which in turn may be controlled by the PLC.

Also illustrated in FIGS. 1(A) and 1(B) is a burner 5a and 5b respectively. The burner 5a and 5b is used for heat input to their respective components. Natural gas or propane are the preferred fuel sources, but liquid fuels or other gaseous fuels may be utilized. Further, burner 5a is attached to the exterior of heating chamber 2 to provide heat internally to heating chamber 2, which indirectly heats the primary chamber 1.

With the burner 5a, the internal area of the heating chamber 2 is heated to temperatures necessary to indirectly heat the feedstock which is contained within the primary chamber 1. Temperature ranges for this internal area can adjusted to account for the type of waste. In one embodiment, the temperature range would be up to 1000° C. This heating may occur at atmospheric pressure, and may ultimately generate synthetic gas from heating feedstock contained within the primary chamber 1. As the heating chamber 2 is heated, the heat of the chamber 2 may be preserved since the heating chamber 2 is made of an insulated shell. The insulated shell of the heating chamber 2 may include an outer layer and an inner layer. The outer layer of certain embodiments may be made of carbon steel, and the inner layer may be made of a high temperature insulating material that may be used in a furnace application. Such examples include ceramic fibers, refractory monoliths, or refractory brick.

To cool the primary chamber section 105, FIGS. 1(A) and 1(B) illustrate that one or more cooling air fans 6 may be provided. In particular, the cooling air fans 6 may supply cool air to the internal area of the heating chamber 2 causing indirect cooling of the primary chamber 1. As illustrated in FIGS. 1(A) and 1(B), a cooling air fan is connected to the internal surface of the heating chamber via a duct. This air flow to the heating chamber can be controlled by a gate valve. The cooling fans 6 may also serve to provide combustion air or cooling air or other gases into the primary chamber via duct pipe 17. Duct pipe 17 is ultimately connected to the tuyere pipes on the primary chamber and passes into the rotating primary by the same means as the inert gas.

FIGS. 1(A) and 1B) further illustrate that the primary chamber section 105 includes a support frame 15, which provides support for the primary chamber 1 and the heating chamber 2. Attached to a trunnion support 22 of the support frame 15 is a trunnion 20. Furthermore, a hydraulic lifting cylinder 10 is provided and attached to the trunnion 20 and the trunnion support 22 of the support frame 15. Although only one hydraulic cylinder 10 is illustrated, in other embodiments, more than one hydraulic lifting cylinder 10 may be utilized. The combination of the hydraulic lifting cylinder 10 and the trunnion 20 provides rotational movement of primary chamber 1 and heating chamber 2 so that these structures may be properly positioned for loading and unloading. That is, the trunnion 20 and hydraulic lifting cylinder 10 may be configured to provide means for rotational movement of the primary chamber 1 and heating chamber 2 for the loading of feedstock into the primary chamber 1.

For example, FIGS. 1(A) and 1(B) illustrate the primary chamber 1 and heating chamber 2 in an operating position. In one embodiment, the primary chamber 1 and the heating chamber 2 may be rotated from 0° horizontal to a 45° angle from vertical during operations. However, in other embodiments, the primary chamber 1 and heating chamber 2 may be rotated to other angles as appropriate for loading and/or unloading, such as, for example to an angle of about 70°. Angling of the primary chamber 1 and heating chamber 2 may also allow for the contents within the primary chamber 1 to be conveniently added or removed.

Prior to operating the primary chamber section 105, the primary chamber 1 may be loaded with feedstock or waste through an opening at the top of the primary chamber 1. To load the feedstock, a lid 11 that covers the opening of the primary chamber 1 is removed, and feedstock is disposed into the primary chamber 1. In certain embodiments, the lid 11 may be an exhaust hood. In other embodiments, the lid 11 may remove combustion products, fumes, smoke, odors, heat, and steam from inside the primary chamber 1 by evacuation and filtration. According to certain embodiments, the lid 11 may be formed from conventional materials that are either identical to or different from the materials that make up the primary chamber 1.

In certain embodiments, the feedstock may include batteries such as lithium ion batteries, mobile phones, laptops, computers, motherboards, and various other computer and/or electrical equipment or devices. In other embodiments, the feedstock may be medical waste items such as human waste contaminated equipment, hardware, medical devices that contain electrical circuits or other hardware, tubing, needles, glass, or other waste materials that may contain or be exposed to harmful pathogens or toxins, or even large hazardous waste boxes that contain medical waste. In some embodiments, the feedstock does not need to be broken down, and can instead be directly deposited into the primary chamber 1. However, if desired, the feedstock may be broken down into smaller parts before being loaded. For larger or heavier feedstock, a gantry may be used for loading into the primary chamber 1.

Once the feedstock has been loaded into the primary chamber 1, the lid 11 may be lowered to seal the opening of the primary chamber 1, and thereby maintaining an inert environment within the primary chamber 1. After sealing the primary chamber 1, residual oxygen within the primary chamber 1 may be removed by displacement with inert gas. Heat may also then be supplied indirectly to the primary chamber via the burner 5a. As the primary chamber 1 is heated, the gearbox 9 may drive the primary chamber 1 causing it to rotate. In addition, as the primary chamber 1 is heated, the feedstock may start to give off gas and disintegrate. Syngas is generated from the elemental material within the feedstock.

During the heating, according to certain embodiments, feedstock disintegration may occur at three different stages depending on the type and volume of feedstock used. However, in other embodiments, a fourth stage may be observed. The first stage may be observed at 250° C., the second stage may be observed at 400° C., and the third stage may be observed at 550° C. In addition, the temperatures at which these stages start and end may vary. The addition of an inert gas into the primary chamber allows for better control and makes the behavior of the feedstock more predictable.

According to certain embodiments, in addition to adding feedstock into the primary chamber 1, milling media may also be added. Milling media may be any used to crush or grind materials, such as balls, beads, cylinders, cut wire, or other shaped materials, and may be formed of materials such as steel, aluminia oxide, metal alloys, tungsten carbide, and the like. The mixing of milling media with the feedstock assists in pulverizing the feedstock into a powder-like concentrate. This grinding process may be helpful during the combined pyrolysis and gasification process as well. Moreover, it may help remove the already gasified layers from the feedstock and expose new layers making the process faster and more uniform.

As illustrated in FIGS. 1(A) and 1(B), a primary chamber exhaust duct 12 is connected to the lid 11. During operation of the primary chamber 1 and the heating chamber 2, toxic gases are produced within the primary chamber 1 from the feedstock. The toxic gases may be removed via an exhaust system, starting at the lid 11. The flow of gases then moves through the primary chamber exhaust duct 12, and then into the secondary chamber 3.

Ultimately, the toxic gases and syngas may be expelled into the atmosphere or can be captured and put back into the flow after reaching a secondary chamber 3. As previously noted, the primary chamber section 105 is connected to the secondary chamber 3 via the primary chamber exhaust duct 12. As illustrated in FIGS. 1(A) and 1(B), there may be provided an explosion door 19 which serves as a safety device in the event that the syngas produced becomes volatile. In certain embodiments the explosion door 19 is a gravity held hatch that is allowed to freely open in the case of a sudden increase of pressure inside the system. The explosion door 19 is sized to allow venting of the rapidly expanding gases. The door can automatically reset itself so as to minimize loss of gas from within the duct system (11, 12, 4, and 13).

Once the toxic gases and syngas reach the secondary chamber 3, they may remain within the secondary chamber 3 for a minimum period of time, such as for example for about 2 seconds. Once the time has elapsed, the gases may be exhausted out to a heat exchanger or boiler, and then to an emissions filter system (not shown).

As illustrated in FIGS. 1(A) and 1(B), the secondary chamber 3 may be provided on the secondary chamber section 110 of the gasifier system 100. The secondary chamber 3 may include a syngas combustion air fan 7, which is connected to the secondary chamber exhaust duct 13 by way of a syngas combustion air diffuser 18. The syngas combustion air diffuser 18 may be made of stainless steel. However, in other embodiments, different materials may be used for forming the syngas combustion air diffuser 18. During operation of the gasifier system 100, since the produced syngas is combustible and is burned in the secondary chamber 3, the syngas combustion air diffuser 18 may be configured to provide combustion air to the secondary chamber 3 in order to burn the syngas. In particular, the combustion air may be supplied by the syngas combustion air fan 7. Thus, in certain embodiments, the secondary chamber 3 is where exothermic reaction of the syngas occurs.

According to certain embodiments, the secondary chamber 3 may have a round tube shape, and the secondary chamber 3 may be fully insulated. In particular, the secondary chamber 3 may be made up of a carbon steel outer shell and a high temperature insulation inner layer. This inner layer may consist of any high temperature insulation; for example ceramic fiber, refractory monoliths, or refractory brick. During operation, the temperature within the secondary chamber 3 may be maintained at a minimum temperature via a natural gas burner, such as burner 5b. The length and diameter of the secondary chamber 3 may be set to give the syngas a minimum of two second retention time in the hot environment before exiting. Further, although FIGS. 1(A) and 1(B) illustrate only one primary chamber 1 and heating chamber 2 of the primary chamber section 105, the secondary chamber 3 can be sized to allow more than one primary chamber 1 and heating chamber 2 embodiment to operate simultaneously. The sizing for such a secondary chamber may be based upon the speed of the combined pyrolysis and gasification in the primary chamber 1 and the expected calorific value of the feedstock. This calorific value can be calculated to provide an equation of potential air flow through the system. The length and diameter of the secondary chamber 3 must be such that the minimum 2 second retention time is maintained at maximum syngas combustion. As illustrated in FIGS. 1(A) and 1(B) the design of the secondary chamber 3 may be cylindrical. Other shapes may be utilized as long as the minimum retention time is maintained.

As illustrated in FIGS. 1(A) and 1(B), the secondary chamber section 110 may also include a draft control device 8. This draft control device 8 may provide a negative draft to the exhaust system in certain embodiments, more specifically the lid 11. The draft control device 8 may consist of an educator type system, as illustrated in FIG. 1(B). It may also consist of one or more induction fans. In addition, the secondary chamber section 110 may include another burner 5b disposed on a side face of the secondary chamber 3, the side face being the same side that the syngas combustion air fan 7 is disposed, and the side face being opposite another side face of the secondary chamber 3 where the secondary stack 14 and educator air fan are disposed. According to certain embodiments, support legs may be provided to support the secondary chamber 3.

In certain embodiments, the gasifier system 100 as a whole may be transported. For transportation, the gasifier system 100 may be disassembled into different components which are then reassembled at a later time for system use.

Figure 2A:
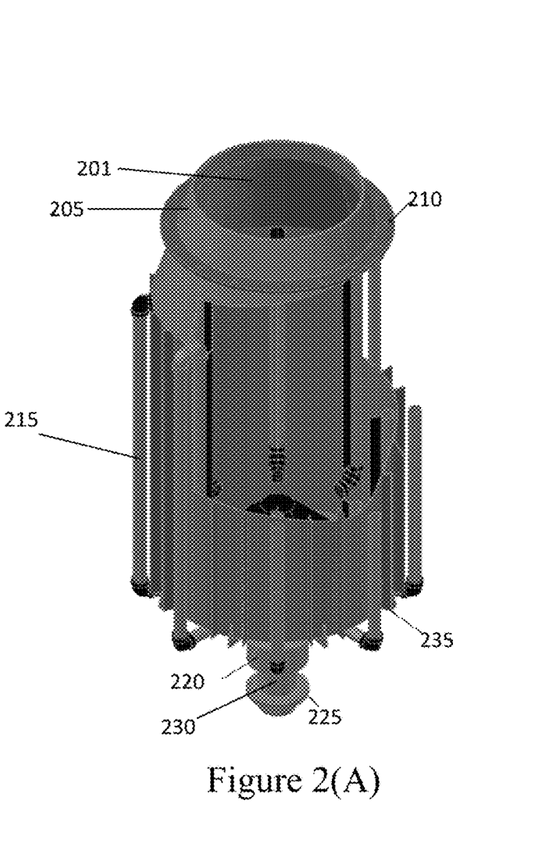
FIG. 2(A) illustrates a perspective view of the primary chamber of FIGS. 1(A) and 1(B) including a cut-out interior view of the primary chamber according to certain embodiments.
Figure 2B:
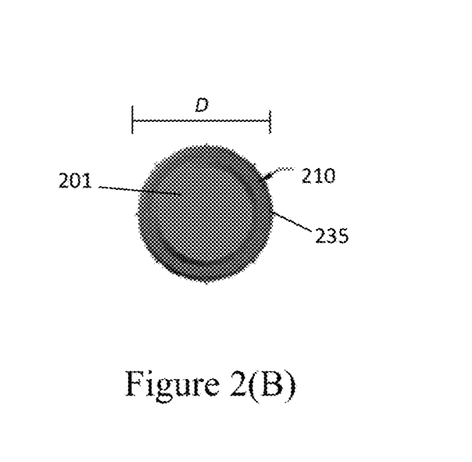
FIG. 2(B) illustrates a plan view of the primary chamber according to certain embodiments.

FIG. 2(A) illustrates a perspective view of the primary chamber 1 of FIGS. 1(A) and 1(B), including a cut-out interior view of the primary chamber 1 according to certain embodiments. Further, FIG. 2(B) illustrates a plan view of the interior of the primary chamber 1 according to certain embodiments. As illustrated in FIG. 2(A), the primary chamber 1 has an opening 201 at a top portion of the chamber. As described above, the opening 201 provides a means for depositing feedstock into the primary chamber 1. In addition, the opening 201 can be sealed by attachment of the lid 11, and the opening 201 may be configured to allow loading and unloading of the feedstock.

FIG. 2(A) also illustrates that the primary chamber 1 has a top cone section 205, which forms a portion of the primary chamber 1 that is sealed by the lid 11. Further, this cone section 205 may be insulated. This insulated cone section serves to protect the seals both on the lid 11 as well as the heating chamber 2. In addition, surrounding the top cone section 205 is an exhaust end support holder 210. The exhaust end support holder 210 may serve as a mounting surface. In addition, as illustrated in FIG. 2(A), the primary chamber 1 may include tuyere pipes 215, disposed on an exterior surface of the primary chamber 1. As further illustrated in FIG. 2(A), the tuyere pipes 215 also extend into the internal space of the primary chamber 1 through a perimeter sidewall of the primary chamber 1.

As further illustrated in FIGS. 2(A) and 2(B), the primary chamber 1 may include one or more heat transfer fins 235 that may transfer heat from the primary chamber 1 to the heating chamber 2. In certain embodiments, the heat transfer fins 235 may be attached to the exterior surface of the primary chamber 1, and may extend from the lower portion of the top cone section 205 to beneath a bottom surface of the primary chamber 1 that is directly opposite the opening 201. The heat transfer fins 235 may also extend in a direction parallel to the length of the primary chamber 1. The heat transfer fins 235 may further be rectangular flat bar welded to the outside of the primary chamber 1 to increase the heat transfer surface area. According to certain embodiments, the heat transfer fins 235 may be made of the same material as the primary chamber 1. However, in other embodiments, different materials providing the same or similar structural features may be used.

Further, extending from the bottom surface of the primary chamber 1 is a shaft 230. Attached to the shaft 230 is a lower seal hub 220 and a bottom bearing support flange 225. In certain embodiments, the shaft 230 may be driven by the gearbox 9, which in turn causes the primary chamber 1 to rotate. The lower seal hub 220 may provide a seal between the rotating shaft 230 and the heating chamber 2. The bottom bearing support flange 225 may consist of a drilled and tapped flange to accept a large diameter 4-way ball bearing capable of supporting the loading primary chamber 1.

Figure 2C:
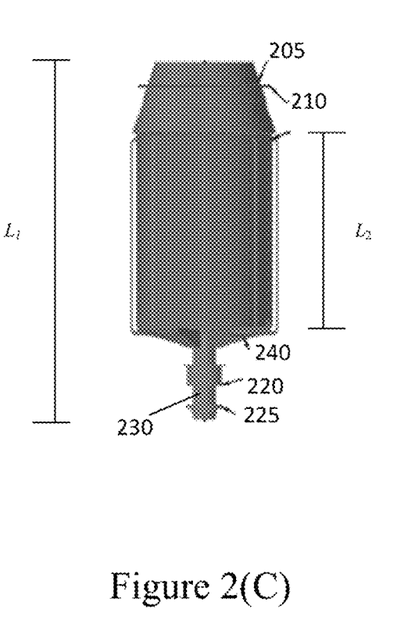
FIG. 2(C) illustrates a side view of the primary chamber according to certain embodiments.

FIG. 2(C) illustrates a side view of the primary chamber 1 according to certain embodiments. As illustrated in FIG. 2(C), the length $L_1$ of the primary chamber 1 (including the shaft 230 to which the lower seal hub 220 and the bottom bearing support flange 225 are attached) may be from about 9 ft. Further, a length $L_2$ from the lower portion of the top cone section 205 to the bottom face of the primary chamber may be about 5 ft. In addition, FIG. 2(C) illustrate stiffeners 240 located at a bottom end of the primary chamber 1. According to certain embodiments, the stiffeners 240 may extend out radially from the shaft 230, and may provide structural support of the primary chamber 1.

Figure 3A:
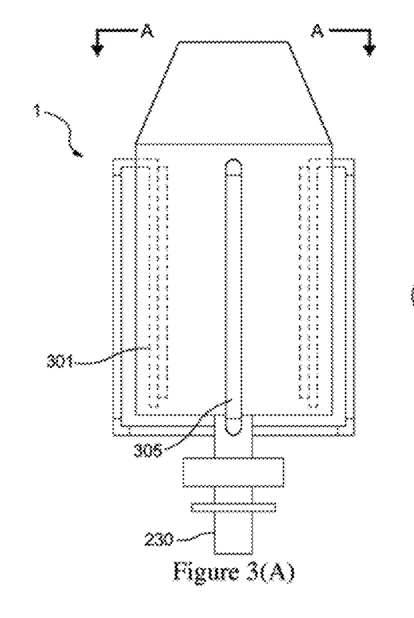
FIG. 3(A) illustrates an internal cross-sectional view of the primary chamber of FIGS. 1(A)-2(C) according to certain embodiments.

FIG. 3(A) illustrates an internal cross-sectional view of the primary chamber 1 of FIGS. 1(A)-2(C) according to certain embodiments. As illustrated in FIG. 3(A), the primary chamber 1 may include one or more tuyere pipes 301 in the interior of the primary chamber 1. For instance, in certain embodiments, the primary chamber 1 may include eight tuyere pipes 301. However, in other embodiments, more or less tuyere pipes 301 may be used. In addition, according to certain embodiments, the tuyere pipes 301 may be disposed in a circumferential direction of the primary chamber 1 interior, and may surround a tuyere 305 located in the center of the primary chamber 1 interior. As illustrated in FIG. 3(A), the tuyere 305 may be connected to the shaft 230 in order to provide means of injecting inert gas or combustion air into the primary chamber 1.

Figure 3B:
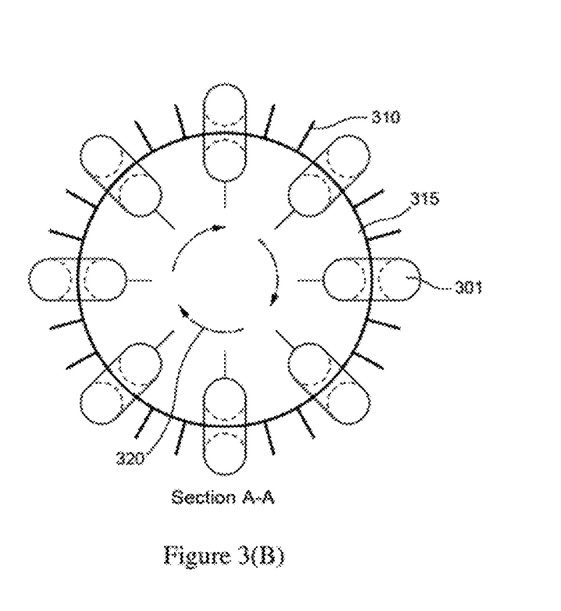
FIG. 3(B) illustrates an internal cross-sectional view of the primary chamber along line A-A of FIG. 3(A) according to certain embodiments.

FIG. 3(B) illustrates an internal cross-sectional view of the primary chamber 1 along A-A of FIG. 3(A) according to certain embodiments. Similar to FIG. 3(A), FIG. 3(B) illustrates an internal cross-section of the primary chamber 1 along line A-A. In particular, FIG. 3(B) illustrates heat transfer fins 310 disposed along an outer circumferential surface of the primary chamber 1. In certain embodiments, the primary chamber 1 may include sixteen fins, but is not limited to such a number of fins. Also illustrated in FIG. 3(B) are the tuyere pipes 301 disposed along an interior circumferential surface of the primary chamber 1, and a chamber shell 315 that serves as an exterior surface of the primary chamber 1. Further, FIG. 3(B) illustrates a rotational movement of the primary shell in the direction of arrow 320 during operation, of with rotation direction may be determined by flight placement and effective direction.

Figure 4:
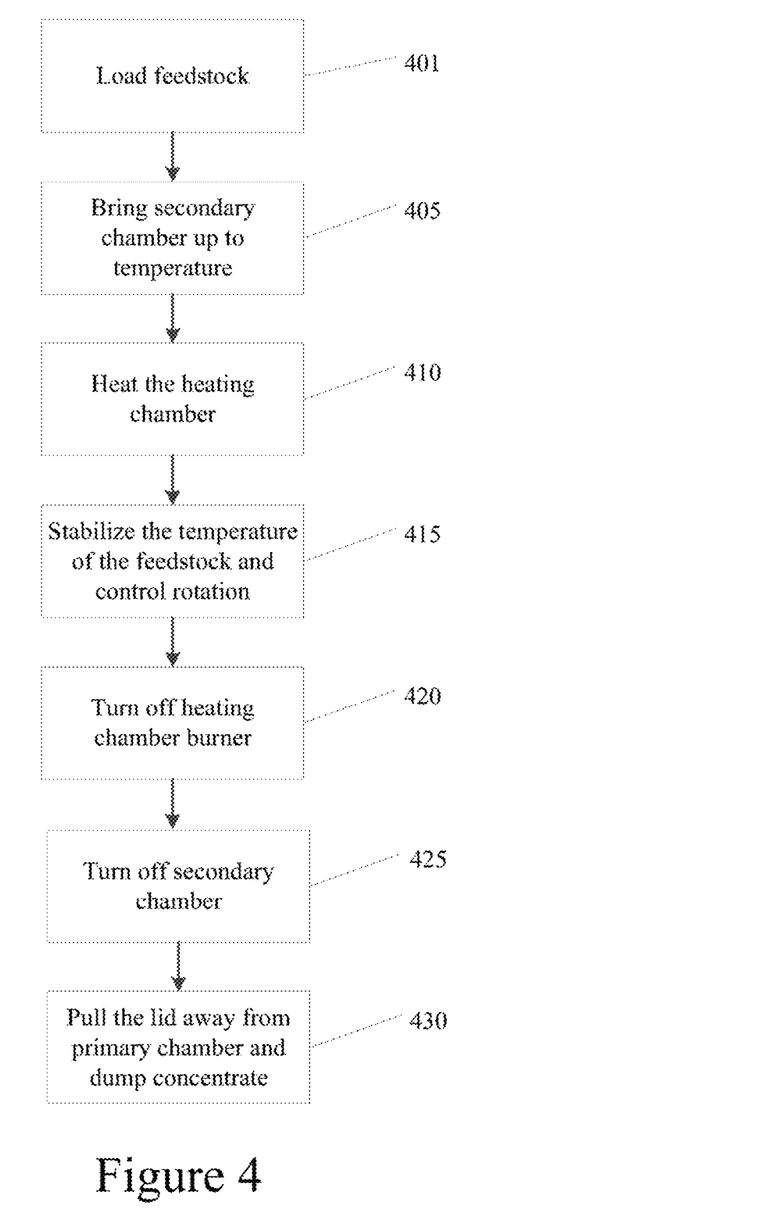
FIG. 4 illustrates a method to reduce waste according to certain embodiments.

FIG. 4 illustrates a method to reduce waste according to certain embodiments. At 401, feedstock may be loaded into the primary chamber. This may be done by rotating the heating/primary chamber assembly to its operating position, and fitting and securing the lid the exhaust to the open end of the primary chamber. Once the primary chamber has been sealed, the primary chamber may be loaded with inert gas, and the heating/primary chamber assembly may be tilted at an angle to facilitate processing of the feedstock. For instance, according to certain embodiments, the heating/primary chamber assembly may be tilted at an angle of about 45°. However, in other embodiments, the heating/primary chamber assembly may be tilted at other useful angles depending on the type of feedstock deposited into the primary chamber and the volume of feedstock deposited.

At 405, the secondary chamber may be brought up to temperature or heated up during the loading process. However, in other embodiments, the secondary chamber may already be at an acceptable temperature from a previous batch. According to certain embodiments, the secondary chamber may be heated to a temperature range of about 1000° C. to about 1100° C.

At 410, the heating chamber may be heated and the primary chamber may be rotated. As the heating chamber is heated, it indirectly heats the primary chamber. Moreover, the rise in temperature of the primary chamber and heating chamber is constantly monitored and may be controlled. Once the feedstock has reached a temperature of about 500-600° C., at 415, the temperature may be stabilized and the rotation may commence for a controlled time depending on the type of feedstock and volume of feedstock. As the primary chamber heats up, the feedstock begins to give off gas in the form of syngas as it is being broken down.

At 420, the heating chamber burner 5a may be turned off, and the cooling fan may be started. During the cooling process, rotation of the primary chamber may continue. At 425, the secondary chamber may be turned off. Once the concentrate is at a low enough temperature for safe handling, at 430, the lid may be pulled away from the primary chamber, and the heating/primary component may be tipped into a downward position to dump out the leftover concentrate.

During the process 410 and 415, the produced syngas is collected in the lid 11, and burned in the secondary chamber 3, after which it is exhausted to the atmosphere or filtered further in an emissions system.

Figure 5:
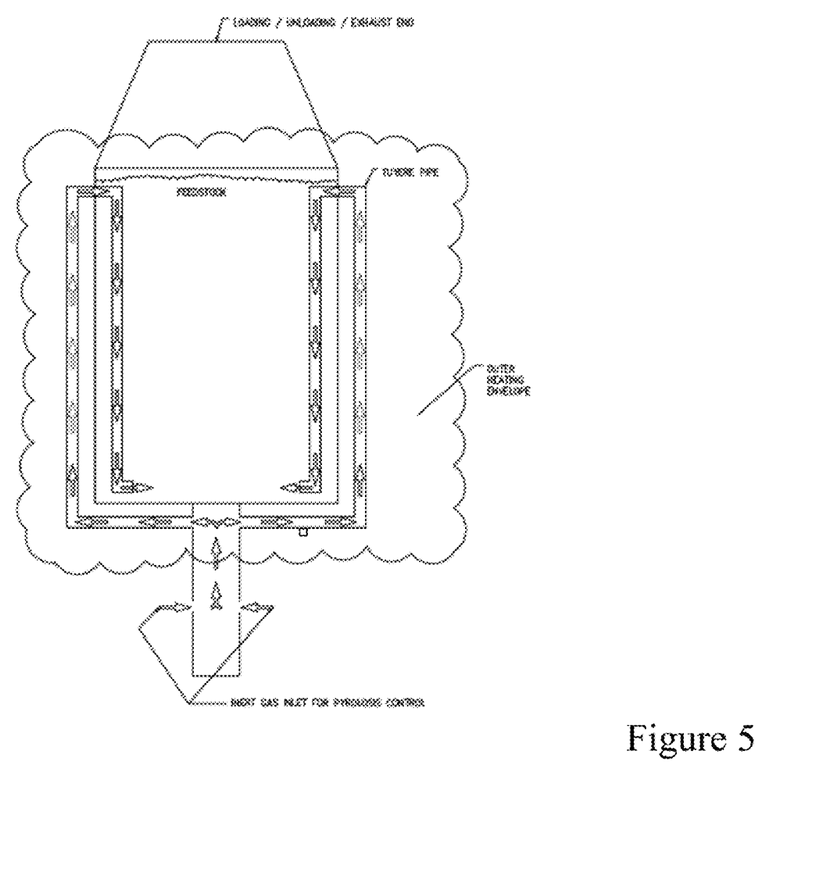
FIG. 5 illustrates an alternative view of the gas flow for pyrolosis control within the primary chamber.

FIG. 5 illustrates an internal cross-sectional view of the primary chamber including use of gas pipes to insert gases into the feedstock. Such inert gases may be used for pyrolosis control, and may be hotter or colder than the feedstock contained in the primary chamber.

The above-described embodiments provide significant improvements and advantages over conventional methods and systems for processing waste. For instance, according to certain embodiments, it may be possible to reduce e-waste to a concentrated ore containing minerals, metals, and carbon. It may also be possible to remove hydrocarbons and nonmetal and non-mineral components. According to other embodiments, it may be possible to solve the need for cost effective, environmentally superior, logistically decentralized capture and processing of a hazardous waste stream of which currently only a small percentage is being managed. It may further be possible to remove the negative consequences of e-waste storage, landfill disposal, incineration, and pyro metallurgical refining. Likewise, the above-described embodiments may reduce medical waste, killing harmful pathogens and recycling materials contained in the medical waste.

According to other embodiments, it may be possible to enable the cessation of the harmful effects on humans in emerging markets where informal dangerous metals extraction processes are common. That is, use of the system for e-waste ensures secure auditable data storage media destruction at decentralized locations. According to certain embodiments, it may be possible to operate in a controlled temperature environment to maximize the recoverability of more metals and minerals than current higher temperature refinery solutions.

In yet further embodiments, it is not required to remove lithium ion batteries from e-waste such as from phones and laptops, and other portable devices. According to certain embodiments, it may also be possible to recycle lithium ion batteries, process and digest whole phones, laptops, and other electronic devices, and provide a process that involves less pre-processing than manual or pyro metallurgical processes for e-waste.

According to other embodiments, it may be possible to use hydro-metallurgical extract of previous metals such as gold, silver, and palladium using small-scale relocatable refineries. It may further be possible to enable a clear, highly concentrated post previous metals extraction residue to be refined with ease by copper smelters, and those seeking to recover cobalt, iridium, barium, erbium, praseodymium, and/or other rare earths.

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. A waste processing method for a waste processing system, the waste processing system having a heating chamber, a primary chamber disposed within the heating chamber, a secondary chamber, and lid, the method comprising:
  loading feedstock into the primary chamber;
  heating the secondary chamber;
  heating the heating chamber with the feedstock inside;
  rotating the primary chamber while the primary chamber is being heated;
  cooling the heating chamber after the heating chamber is heated for a predetermined amount of time; and removing leftover concentrate after heating the heating chamber for the predetermined amount of time.

2. The waste processing method according to claim 1, wherein loading the feedstock comprises:
   rotating the primary chamber and the heating chamber to an operating position;
   securing the lid to an open end of the primary chamber;
   loading the primary chamber with an inert gas; and
   tilting the heating chamber and the primary chamber to a predetermined angle to facilitate processing of the feedstock.

3. The waste processing method according to claim 1, wherein the secondary chamber is heated during the loading of the feedstock.

4. The waste processing method according to claim 1, further comprising heating the secondary chamber to a temperature range of about 1000° C. to about 1100° C.

5. The waste processing method according to claim 1, wherein the method further comprises:
   collecting, in the lid, syngas produced while heating the heating chamber;
   sending the syngas from the primary chamber to the secondary chamber;
   burning the syngas in the secondary chamber; and
   exhausting the burned syngas out of the waste processing system.

6. The waste processing method according to claim 1, wherein the temperature of the primary chamber and a timing of the rotation of the heating chamber are controlled based on feedstock type and feedstock volume.

7. The waste processing method according to claim 1, further comprising heating the feedstock to a temperature of about 500° C. to about 600° C.

8. The waste processing method according to claim 1, wherein the method further comprises tilting the heating chamber and the primary chamber to an angle of about 45°.

9. The waste processing method according to claim 1, wherein the method further comprises cooling the heating chamber with a cooling air fan.

10. The waste processing method according to claim 1, wherein the rotation of the primary chamber is performed by driving a drive motor, which is attached to a bottom surface of the primary chamber and the heating chamber.

11. The waste processing method according to claim 1, wherein the feedstock comprises computer or electrical equipment, or medical waste items.

\* \* \* \* \*